(12) United States Patent
Schilder et al.

(10) Patent No.: US 11,679,658 B2
(45) Date of Patent: Jun. 20, 2023

(54) ELECTRIC DRIVE DEVICE FOR A MOTOR VEHICLE

(71) Applicant: MERCEDES-BENZ GROUP AG, Stuttgart (DE)

(72) Inventors: Tobias Schilder, Ludwigsburg (DE); Tobias Haerter, Stuttgart (DE); Philip Gansloser, Bad Ditzenbach (DE); Heiner Kunckel, Heroldstatt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/795,249

(22) PCT Filed: Dec. 9, 2020

(86) PCT No.: PCT/EP2020/085332
§ 371 (c)(1),
(2) Date: Jul. 26, 2022

(87) PCT Pub. No.: WO2021/151568
PCT Pub. Date: Aug. 5, 2021

(65) Prior Publication Data
US 2023/0100344 A1    Mar. 30, 2023

(30) Foreign Application Priority Data

Jan. 31, 2020  (DE) ..................... 10 2020 000 664.7

(51) Int. Cl.
*B60K 17/16*  (2006.01)
*B60K 1/00*   (2006.01)

(52) U.S. Cl.
CPC .............. *B60K 1/00* (2013.01); *B60K 17/165* (2013.01); *B60K 2001/001* (2013.01)

(58) Field of Classification Search
CPC .. B60K 1/00; B60K 17/165; B60K 2001/001; B60Y 2200/91; B60Y 2410/1022;
(Continued)

(56) References Cited

U.S. PATENT DOCUMENTS 11,351,849 B2    6/2022  Schilder et al.
2017/0307055 A1* 10/2017 Scharr .................. B60K 17/046

FOREIGN PATENT DOCUMENTS

CN    213472793 U  *  6/2021  ............... B60K 1/00
DE    102017006266 A1    1/2019
(Continued)

OTHER PUBLICATIONS

International Search Report dated Mar. 12, 2021 in related/corresponding International Application No. PCT/EP2020/085332.
(Continued)

*Primary Examiner* — Justin Holmes
(74) *Attorney, Agent, or Firm* — Patent Portfolio Builders PLLC

(57) ABSTRACT

An electric drive device for a motor vehicle has a housing, a first planetary gearset arranged in the housing and which has a first sun gear as first elements, a first planetary support, and a first gear ring. A second planetary gearset is arranged in the housing and has a second sun gear that is coupled or can be coupled non-rotationally to the first gear ring as second elements and a second planetary support and a second gear ring. The device has an electric motor, which has a stator and a rotor, an input shaft that can be driven by the rotor and is permanently non-rotationally connected to the first sun gear, an output shaft, having a differential transmission, a lateral shaft and having a first switching element, which is provided to connect the first sun gear non-rotationally to the housing. The rotor, the first planetary gearset, the second planetary gearset, and the differential
(Continued)

Figure 1:
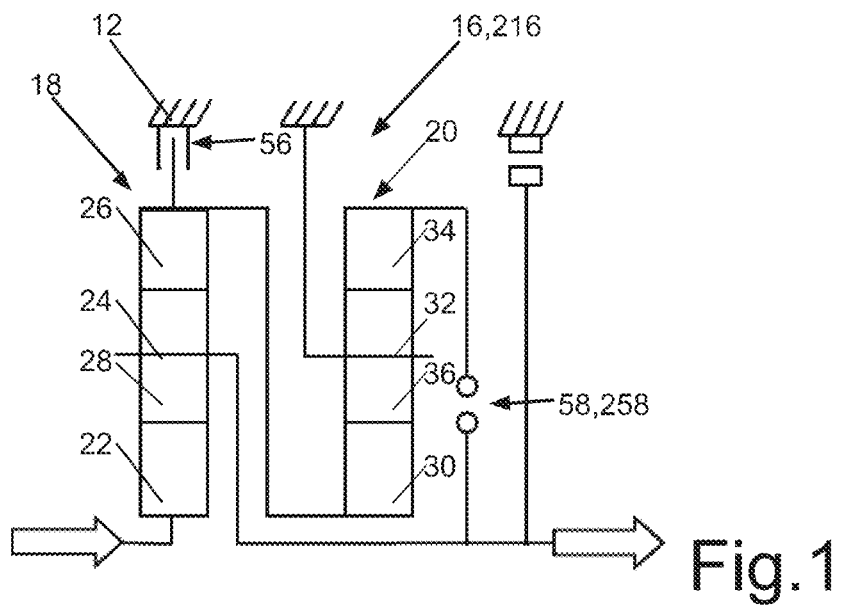

transmission are arranged coaxially to one another. The lateral shaft is arranged between the differential transmission and a wheel of the motor vehicle and penetrates the rotor.

7 Claims, 3 Drawing Sheets

(58) Field of Classification Search
CPC .......... F16H 3/66; F16H 57/021; F16H 57/08; F16H 2200/0021; F16H 2200/0034; F16H 2200/2007; F16H 2200/2035; F16H 2200/2064; F16H 2200/2094; F16H 2200/2097

See application file for complete search history.

(56) References Cited

FOREIGN PATENT DOCUMENTS

| DE | 102018001508 B3 | | 5/2019 | |
|----|----|----|----|----|
| DE | 102017011401 A1 | | 6/2019 | |
| DE | 102018008939 B3 | * | 12/2019 | ............... B60K 1/00 |
| DE | 102018008939 B3 | | 12/2019 | |
| EP | 0355251 A1 | * | 2/1990 | |
| JP | H05116549 A | | 5/1993 | |
| WO | 2019137799 A1 | | 7/2019 | |

OTHER PUBLICATIONS

Office Action created Oct. 6, 2020 in related/corresponding DE Application No. 10 2020 000 664.7.
Written Opinion dated Mar. 12, 2021 in related/corresponding International Application No. PCT/EP2020/085332.

* cited by examiner

ELECTRIC DRIVE DEVICE FOR A MOTOR VEHICLE

BACKGROUND AND SUMMARY OF THE INVENTION

Exemplary embodiments of the invention relate to an electric drive device for a motor vehicle.

JP H05 116 549 A discloses an electric drive device having a housing, a first planetary gearset and a second planetary gearset. The planetary gearsets are arranged in the housing. The planetary gearset has a first sun gear, a first planetary support and a first gear ring, wherein the first sun gear, the first planetary support and the first gear ring are first elements of the first planetary gearset or are also referred to as first elements of the first planetary gearset. The second planetary gearset has a second sun gear that is or can be coupled non-rotationally to the first gear ring, a second planetary support and a second gear ring that is coupled or can be coupled non-rotationally to the first planetary support. The second sun gear, the second planetary support and the second gear ring are second elements of the second planetary gearset or are also referred to as second elements of the second planetary gearset.

Furthermore, such drive devices are also known from DE 10 2018 008 939 B3 and the generic DE 10 2017 006 266 A1.

Exemplary embodiments of the present invention are directed to an electric drive device of the kind mentioned above having a particularly efficient operation and a particularly compact construction of the drive device.

The starting point is an electric drive device for a motor vehicle, which has a housing. A first planetary gearset is arranged in the housing, which, as first elements, has a first sun gear, a first planetary support and a first gear ring. Furthermore, a second planetary gearset is arranged in the housing, which, as second elements, has a second sun gear that is coupled or can be coupled non-rotationally to the first gear ring, a second planetary support and a second gear ring. Furthermore, the electric drive device has an electric motor, which has a stator and rotor. Furthermore, an input shaft that can be driven by the rotor and is permanently non-rotationally connected to the first sun gear, an output shaft, a differential transmission, and a lateral shaft that can be driven by the differential transmission are provided.

A first switching element is provided to non-rotationally connect the first gear ring to the housing, wherein the rotor, the first planetary gearset, and the differential transmission are arranged coaxially to one another, and wherein the lateral shaft is arranged between the differential transmission and a wheel of the motor vehicle and pushes through the rotor.

Furthermore, it is assumed that, on the one hand, the second planetary support is permanently non-rotationally connected to the housing.

Furthermore, a second switching element is provided in a known manner, by means of which one of the second elements can be non-rotationally connected to one of the first elements.

Furthermore, it is assumed that the differential transmission has a ball differential having a compensation housing, wherein the compensation housing is permanently non-rotationally connected to the first planetary support.

The ball differential is preferably a bevel gear differential, which has compensation gears rotatably mounted on the compensation housing. Moreover, the ball differential has output gears, which mesh, in particular simultaneously, with the compensation gears. The compensation gears and the output gears are, in a known manner, gear wheels of the ball differential, wherein the gear wheels are preferably formed as bevel gears. The output gears can be driven by the compensation gears, wherein output shafts can be driven via the output gears. Respective wheels of the motor vehicle can be driven via the output shafts, which are formed, for example, as cardan shafts and are also referred to as lateral shafts. The ball differential is characterized, in particular, in that the compensation housing delimits a receiving chamber or receiving region, in which the gear wheels are at least partially, in particular extensively or completely, arranged or received. Here, the receiving chamber or receiving region is formed on the side of the inner periphery to be at least substantially round or spherical or spherical segment-shaped.

The ball differential has a function that is already sufficiently known from the general prior art.

Furthermore, it is assumed that the first sun gear is arranged axially, i.e., in the axial direction of the planetary gearsets arranged coaxially in relation to each other, next to the compensation housing. Here, the largest outer diameter of the compensation housing is greater than an outer diameter, in particular the largest outer diameter, of the first sun gear.

When the respective element is not non-rotationally connected to the housing, i.e., is not fixed non-rotationally on the housing, the respective element of the respective planetary gearset can be rotated around an axis of rotation, also referred to as the main axis of rotation, or is rotated around the main axis of rotation in relation to the housing when the respective planetary gearset is driven, i.e., when a torsional moment is introduced into the respective planetary gearset. Here, the axial direction of the respective planetary gearset coincides with the main axis of rotation, wherein the axial direction of the electric drive device coincides overall to the main axis of rotation. Here, the radial direction of the respective gearset runs perpendicularly to the axial direction. The first elements, the second elements and the housing are respective components of the drive device or are also referred to as respective components of the drive device.

Furthermore, it is provided in a known manner that the second sun gear is arranged to axially overlap, i.e., in the axial direction of the respective planetary gearset, with the compensation housing, such that at least one partial region of the compensation housing, for example, is covered or overlapped in a direction coinciding with the axial direction of the respective planetary gearset by the first sun gear.

The feature that the planetary gearsets are arranged coaxially to the differential transmission is to be understood, in particular, to mean that the main axis of rotation coincides with the differential axis of rotation. The main axis of rotation also corresponds to an axis of rotation of the input shaft and an axis of rotation of the output shaft.

It is further understood that the second switching element is arranged in a moment flux between the second gear ring and the first planetary gearset in such a way that the second gear ring can be non-rotationally connected to the first planetary gearset by means of the second switching element, wherein the first gear ring is permanently non-rotationally connected to the second sun gear. Thus, on one hand, a transmission gear can be formed with favorable gear ratio; on the other hand the second switching element can be arranged advantageously.

Moreover, it is understood that the second switching element is arranged axially, i.e., in the axial direction of the planetary gearset, on a side of the second planetary gearset facing away from the first planetary gearset.

Finally, it is provided in a known manner that at least one part of the first switching element is arranged radially surrounding and axially overlapping with the first planetary gearset. The feature that at least one part of the switching element is arranged radially surrounding the first planetary gearset is to be understood to mean that at least one axial partial region of the first planetary gearset is covered in the radial direction of the first planetary gearset outwardly by at least one partial region of the first switching element. Particularly advantageously, a force transmission region of the first switching element is arranged radially surrounding the first planetary gearset, which means that an inner diameter of the force transmission region is greater than an outer diameter of the first planetary gearset. Here, the force transmission region is advantageously formed by a lamella package, consisting of outer lamellae and inner lamellae, of the first switching element.

According to the invention, a first radial bearing is provided that is formed to support the first planetary support radially in opposition to the first sun gear, wherein the first radial bearing is arranged axially on a side of the first planetary gearset facing away from the second planetary gearset.

Furthermore, the invention provides a second radial bearing, which is formed to support the second sun gear against the compensation housing.

According to the invention, exactly two radial bearings, namely the first radial bearing and the second radial bearing, are provided.

Overall, such a compact electric drive device emerges, in which two advantageously stepped transmission gears are possible, wherein, despite the high degree of compactness, an oiling of the corresponding elements is also made possible.

In the scope of the invention, a non-rotational connection of two rotatably mounted elements is to be understood, in particular, to mean that the two elements non-rotationally connected to each other are arranged coaxially to each other and are connected to each other in such a way that they rotate with the same angular speed, in particular when they are driven.

A non-rotational connection of a rotatably mounted element to the housing is to be understood to mean that the element non-rotationally connected to the housing is connected to the housing in such a way that the element connected non-rotationally to the housing cannot be rotated in relation to the housing, i.e., that the element non-rotationally connected to the housing is secured against relative rotations happening in relation to the housing.

In the context of the invention, a permanently non-rotational coupling or connection is to be understood, in particular, to mean that two components permanently non-rotationally connected to each other are connected or coupled to each other constantly or durably in a non-rotational manner, such there no coupling device or no switching element is provided by means of which this permanently non-rotational coupling or connection could be lifted or which can be switched between a coupling state causing the non-rotational coupling and an uncoupling state raising the non-rotational coupling.

The first switching element can be switched between a first connecting state and a first release state, for example. The first connecting state corresponds, for example, to at least one first connecting position, wherein the first release state corresponds, for example, to at least one first release state. Thus, the first switching element, for example, can be moved, in particularly in relation to the housing and/or translationally, between the first connecting position and the first release position. In the first connecting state, the first gear ring is connected non-rotationally to the housing by means of the first switching element, such that the first gear ring also does not rotate or cannot rotate in relation to the housing, in particular when the first planetary gearset is driven. In the first release state, however, the first switching element releases the first gear ring for rotations in relation to the housing, such that the first gear ring rotates or can rotate in relation to the housing, in particular around the main rotational axis, in particular when the first planetary gearset is driven.

The second switching element can be switched between a second connecting state and a second release state, for example. The second connecting state corresponds, for example, to at least one second connection point of the second switching element, wherein the second release state corresponds, for example, to at least one second release position of the second switching element. The second switching element can be moved, for example, in particular translationally and/or in relation to the housing, between the second connection state and the second release state. In the second connection state, the one second element is non-rotationally connected to the one first element by means of the second switching element, such that the one second element cannot rotate in relation to the one first element, in particular also when the planetary gearset is driven. In the second release state, however, the second switching element releases the one second element in relation to the one first element, such that the one second element rotates or can rotate in relation to the one first element, in particular around the main rotational axis, in particular when the second planetary gearset is driven.

Very particularly advantageously, in this context, the second switching element is arranged axially between the second planetary gearset and a parking lock wheel, wherein the parking lock wheel is non-rotationally connected to the compensation housing. In this particularly advantageous arrangement in which the first planetary gearset, the second planetary gearset, the second switching element, and the parking locking wheel are arranged one after the other in this order when seen in the axial direction, a first coupling element of the second switching unit can be connected advantageously non-rotationally and axially shiftably to a hub of the parking locking wheel, wherein a second coupling element of the second switching element is non-rotationally connected to the second gear ring.

In a particularly advantageous design of the invention, the electric drive device has a first axial bearing, which is formed to axially support the first planetary gearset against the second sun gear. In other words, the first planetary gearset, for example, can be supported or is supported axially against the second sun gear or on the second sun gear. In general, in the context of the invention, an axial bearing is to be understood as a bearing which can absorb axial forces.

Here, the first axial bearing is particularly advantageously arranged axially, i.e., in the axial direction of the respective planetary gearset, between the first planetary gearset and the second planetary gearset. Thus, a bearing without losses can be represented in a manner favorable in terms of construction space.

A further advantageous development is characterized in that the electric drive device has a second axial bearing, which is arranged axially between the second sun gear and a second gear ring shaft of the second gear ring, wherein the second axial bearing is arranged axially on a side of the second planetary gearset facing away from the first planetary gearset. As a result, the requirement for construction space can be kept low.

In addition to the second axial bearing, a third axial bearing can be provided. The third axial bearing is formed to support the second planetary gearset axially against the second gear ring, wherein the third axial bearing is arranged axially on a side of the second axial bearing facing away from the second planetary gearset. In other words, the second planetary gearset can be supported or is supported in the axial direction against the second gear ring or on the second gear ring, for example by means of the third axial bearing, and is thus mounted, such that an efficient bearing without losses can be represented in a manner that is favorable to construction space.

A further development provides a fourth axial bearing by means of which the second sun gear can be supported axially against the parking locking wheel and thus also against the compensation housing. The fourth axial bearing is advantageously arranged between the second planetary gearset and the parking locking wheel.

A further development provides a fifth axial bearing which is formed to support the compensation housing and, with this, the first planetary gearset against the housing, wherein the fifth axial bearing is arranged axially on the side of the second planetary gearset facing away from the first planetary gearset and thus "on the output side" of the second planetary gearset and radially inside the largest outer diameter of the compensation housing. The fifth axial bearing is advantageously arranged axially adjacent to the fourth axial bearing. The compensation housing is also referred to as a differential cage or is formed as a differential cage, on which at least the compensation wheels can be rotatably mounted.

Particularly advantageously, exactly four axial bearings are provided, namely the first axial bearing, the second axial bearing, the fourth axial bearing, and the fifth axial bearing, wherein the first axial bearing is arranged axially between the first and the second planetary gearset, and the second axial bearing, the fourth axial bearing, and the fifth axial bearing are arranged axially on the side facing away from the first planetary gearset.

In order to be able to represent a particularly efficient operation in a manner favorable in terms of construction space, it is provided in a further design of the invention that the first switching element is formed as a lamellae switching element. Here, the first switching element has, for example, several lamellae arranged one behind the other in the axial direction or following on from one another, in particular friction lamellae, which can be compressed or pressed together. Thus, the first switching element, for example, can connect at least or exactly two of the components to each other in a non-rotational manner, in particular solely with a frictional connection. Here, it has been shown to be advantageous when the second switching element has at least one positive locking element and is thus preferably formed as a positive locking element, in particular as a claw coupling. Thus, an operation that is particularly favorable in terms of the degree of effectiveness can be guaranteed.

In a further advantageous development of the invention, the electric drive device comprises a second connecting element formed integrally with an inner lamellae support of the first switching element, which connecting element is connected non-rotationally to the first gear ring on a first side by means of a first plug or welding connection on non-rotationally to the second sun gear on a second side by means of a second plug or welding connection. In doing so, the requirement for construction space can be easily kept low.

The feature that the second switching element has at least one positive locking element can be understood, in particular, as follows: In a first variant, the positive locking element can be a positive locking switching element inherently, in particular a claw coupling. In the first variant, it is preferably provided that the second switching element solely or only has the positive locking element and thus is formed overall as a positive locking switching element, in particular as a claw coupling. Thus, in the first variant, the second switching element, for example, solely enables a positive locking non-rotational connection. In a second variant, it is conceivable that the positive locking element is formed inherently as a positive locking switching element, in particular as a claw coupling. In the second variant, the second switching element additionally comprises a frictionally connected switching element, in particular a lamellae switching element. Thus, in the second variant, the second switching element enables a positive locking non-rotational connection due to the positive locking element and a force- or frictionally-connected non-rotational connection due to the lamellae element.

In a third variant, it is conceivable that the positive locking element is formed as a switchable freewheel, in particular. In the third variant, the second switching element is preferably formed overall or inherently as a switchable freewheel, in particular, such that, in the third variant, the second switching element only or exclusively has the switchable freewheel, in particular, as the positive locking element. Thus, in the third variant, the second switching element exclusively enables a positive locking, non-rotational connection. In a fourth variant, it can be provided that the positive locking element is formed as the freewheel described above, in particular as the switchable freewheel described above. In the fourth variant, the second switching element moreover comprises a frictional or form-fit switching element, such as a lamellae switching element, for example. Thus, in the fourth variant, the second switching element can enable a force- or frictional locking, non-rotational connection and a positive locking, non-rotational connection.

Further advantages, features and details of the invention result from the description of preferred exemplary embodiments below, as well as by means of the figures.

BRIEF DESCRIPTION OF THE DRAWING FIGURES

Figure 2:
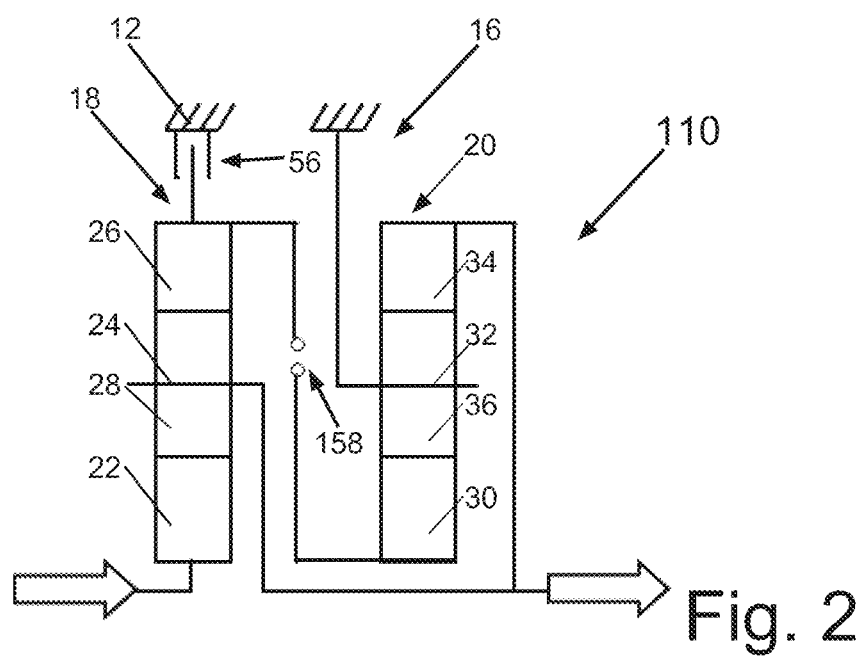
Figure 3:
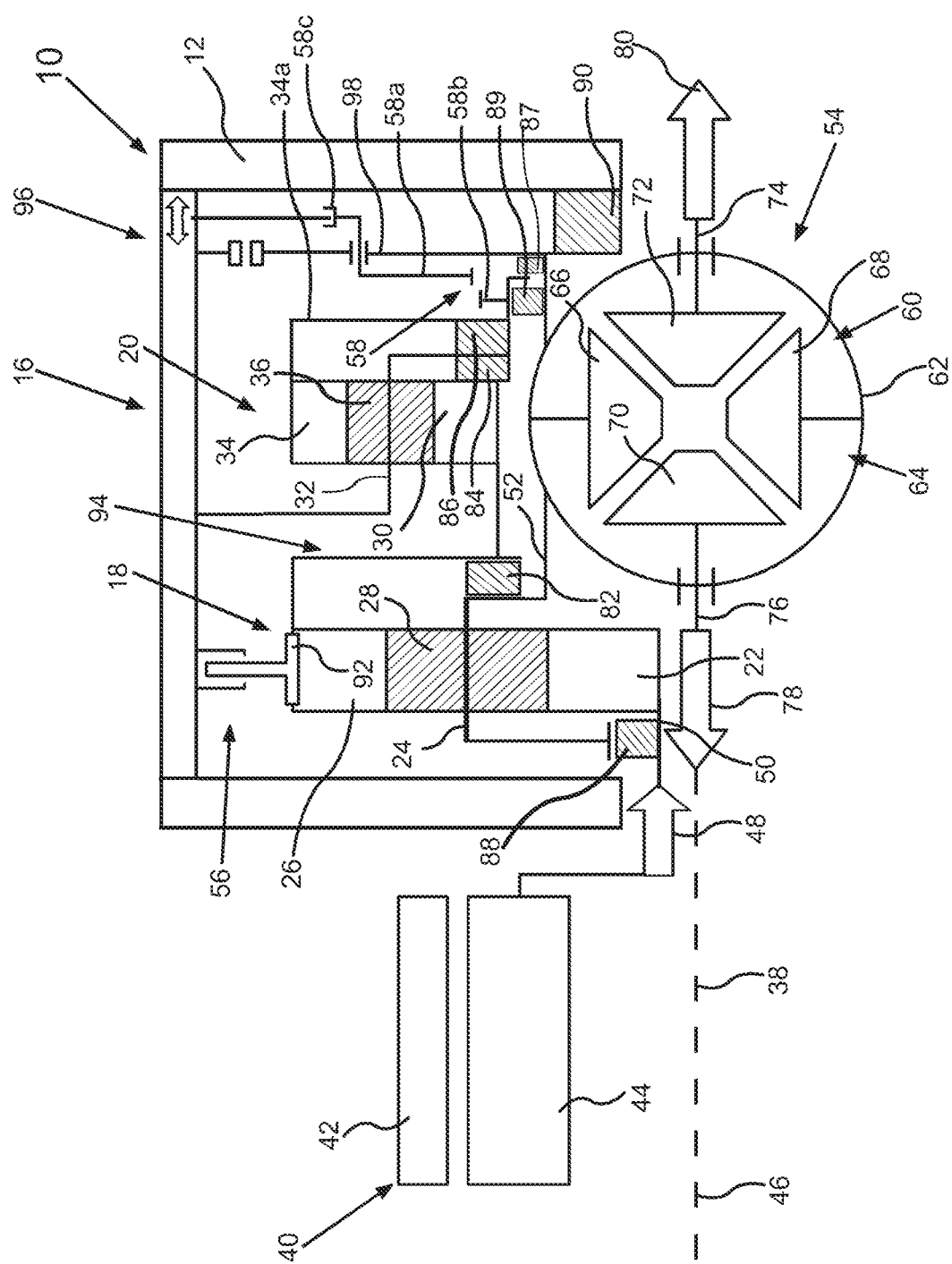
Figure 4:
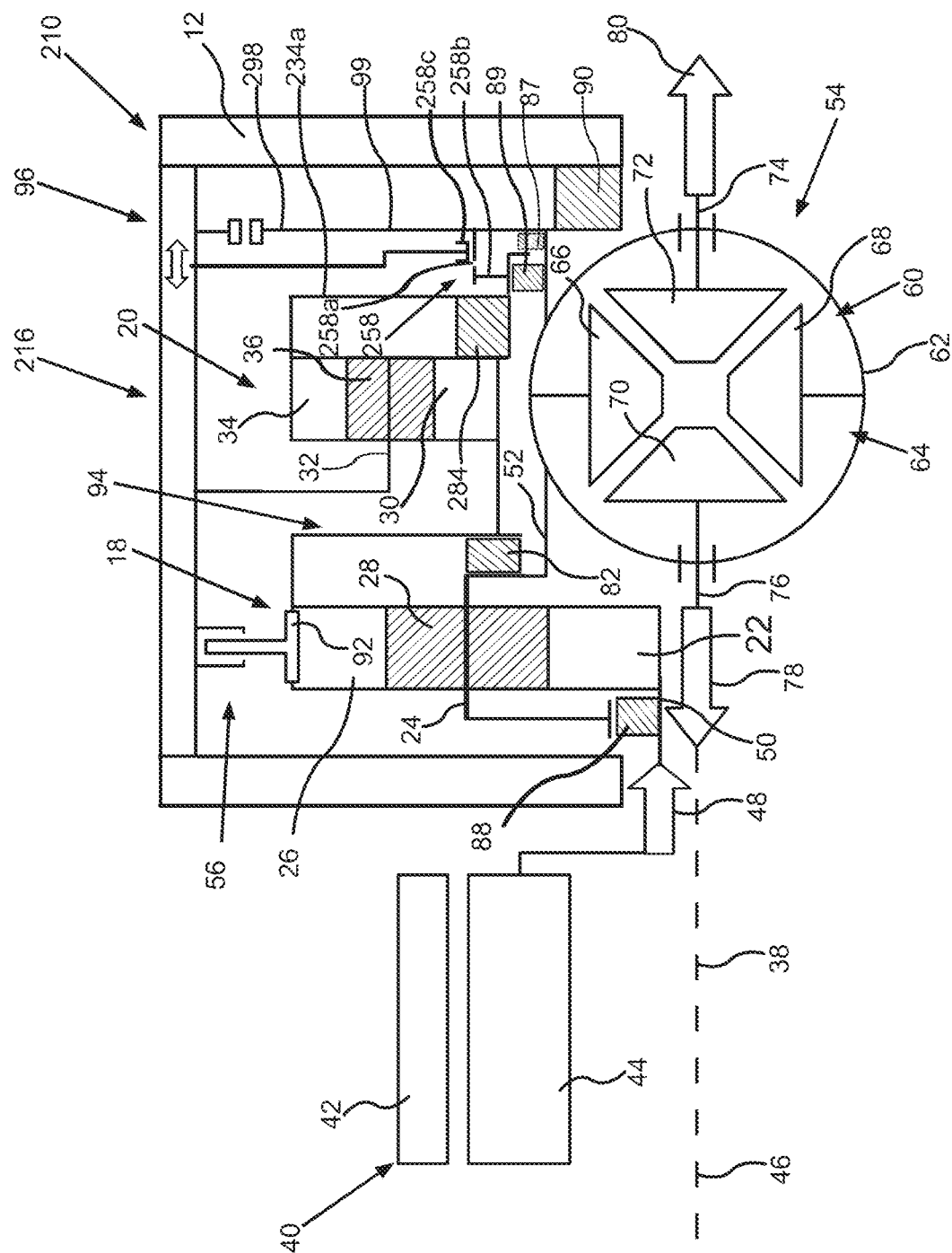

In the drawing is shown:

FIG. 1 a schematic depiction of a transmission part of a first embodiment of an electric drive device according to the invention for a motor vehicle;

FIG. 2 a schematic depiction of a transmission part of a second embodiment of the electric drive device;

FIG. 3 the first embodiment in a first variant;

FIG. 4 the first embodiment in a second variant.

In the figures, the same or functionally identical elements are provided with the same reference numerals.

DETAILED DESCRIPTION

FIG. 1, FIG. 3, and FIG. 4 show, in a schematic depiction, a first embodiment of an electric drive device 10, 210 for a motor vehicle, in particular for a car, such as a passenger motor vehicle for example.

Here, FIG. 1 only shows a schematically depicted planetary transmission 16, 216 of the first embodiment. FIGS. 3 and 4 show a first variant and a second variant of the first embodiment, wherein the variants differ only in terms of details that are not depicted in FIG. 1.

The motor vehicle is an electric vehicle, in particular a battery electric vehicle, and can be driven in particular exclusively electrically. Here, the motor vehicle can be, in particular, exclusively electrically driven by means of the electric drive device 10, 210. The electric drive device 10, 210 comprises a schematically depicted housing 12. Moreover, the electric drive device 10, 210 comprises the planetary transmission 16, 216, which is arranged or incorporated in the housing 12. The planetary transmission 16, 216 and thus the electric drive device 10, 210 comprises a first planetary gearset 18 and a second planetary gearset 20, which are arranged coaxially to each other. The first planetary gearset 18 has a first sun gear 22, a first planetary support 24, and a first gear ring 26. The first sun gear 22, the first planetary support 24, and the first gear ring 26 are first elements of the planetary gearset 18 or are also referred to first elements. Moreover, the first planetary gearset 18 comprises at least one first planetary gear 28, which is mounted rotatably on the planetary support 24 and simultaneously meshes with the first sun gear 22 and with the first gear ring 26.

The second planetary gearset 20 has a second sun gear 30, a second planetary support 32, and a second gear ring 34. The second sun gear 30, the second planetary support 32, and the second gear ring 34 are second elements of the planetary gearset 20 or are also referred to as second elements. The sun gears 22 and 30, the planetary supports 24 and 32 and the gear rings 26 and 34 and the housing 12 are also referred to as components of the drive device 10, 210. Here, the planetary gearsets 18 and 20 are incorporated or arranged in the housing 12. The second planetary gearset 20 moreover comprises at least one second planetary gearset 36, which is mounted rotatably on the second planetary support 32 and simultaneously meshes with the second sun gear 30 and with the second gear ring 34. The planetary supports 24 and 32 are also referred to as webs.

In particular when the respective element is not non-rotationally connected to the housing 12, the respective element rotates around a rotational axis, also referred to as the main rotational axis, in relation to the housing 12 or the respective element rotates around the main rotational axis 38 in relation to the housing 12 when the respective planetary gearset 18 or 20 is driven, i.e., when a torsional moment is introduced into the respective planetary gearset 18 or 20. Alternatively or additionally, the respective components can rotate around the main rotational axis 38 in relation to one another, in particular when the respective components are not non-rotationally connected to one another. For example, if two of the components are non-rotationally connected to one another or non-rotationally coupled to one another, then the components non-rotationally connected to each other are secured against rotations taking placed in relation to one another. For example, if two of the elements are non-rotationally connected or coupled to one another and if the planetary gearsets 18 and 20 are driven, then the elements non-rotationally connected to one another are rotated and thus as a block around the main rotational axis 38, in particular in relation to the housing 12. This means that the elements non-rotationally connected to one another revolve as a block. For example, if the respective element is connected or coupled non-rotationally to the housing 12, then the respective element is secured against rotations taking place in relation to the housing 12 and around the main rotational axis 38, such that the respective element non-rotationally connected to the housing 12 cannot rotate around the main rotational axis 38 in relation to the housing 12.

It can be seen from FIG. 1, FIG. 3, and FIG. 4 that, in the case of the first embodiment, the second sun gear 30 is coupled non-rotationally to the first gear ring 2. In the first embodiment shown in FIG. 1, FIG. 3, and FIG. 4, the second sun gear 30 is permanently non-rotationally connected to the first gear ring 26.

The electric drive device 10, 210 moreover comprises an electric motor 40 schematically depicted in FIG. 3 and FIG. 4, by means of which the motor vehicle can be driven electrically. For example, at least or exactly two wheels of the motor vehicle spaced apart in the transverse direction of the vehicle can be driven electrically by means of the electric motor 40. By driving the wheels electrically, the motor vehicle overall can be electrically driven. To do so, the electric motor 40 comprises a stator 42 schematically depicted in FIG. 3 and FIG. 4 and a rotor 44. The rotor 44 can be rotated in relation to the stator 42 around an motor rotational axis 46. Here, the motor rotational axis 46 coincides with the main rotational axis 38. In particular, the rotor 44 can be driven by the stator 42 and thus can be rotated in relation to the stator 42 around the motor rotational axis 46. The electric motor 40 can be operated in an motor operation and thus as an electric motor. The electric motor 40 can provide torsional moments via the rotor 44 for driving the wheels, in particular purely electrically, and thus the motor vehicle. This respective torsional moment provided by the electric motor 40 via the rotor 44 for electrically driving the wheels is illustrated in FIG. 3 by an arrow 48.

The electric drive device 10, 210, in particular the planetary transmission 16, 216, has an input shaft 50 permanently non-rotationally connected to the first sun gear 22, the input shaft 50 being able to be driven by the rotor 44 and, in particular be rotated in relation to the housing 12 around the main rotational axis 38 or around the motor rotational axis 46. For example, the input shaft 50 is permanently non-rotationally connected to the rotor 44. The elements of the planetary gearsets 18 and 20 and the input shaft 50 are also referred to, for example, as components. In terms of a torsional moment flux running to the wheels from the rotor 44 via the planetary transmission 16, 216, via which torsional moment flux the respective torsional moment provided by the electric motor 40 via its rotor 44 are transferred to the wheels by the rotor 44 via its rotor 44, the input shaft 50 is the first of the components to which the respective torsional moment provided by the electric motor is transferred. In other words, the input shaft 50 is arranged upstream in the torsional moment flux of the other or all other components, so that the respective torsional moment provided by the electric motor 40 via the rotor 44, in terms of the components, is firstly transferred to the input shaft 50 and only after this to the respectively remaining or other components. Thus, the respective torsional moment provided by the electric motor 40, for example, can be introduced into the planetary transmission 16, 216 via the input shaft 50.

The electric drive device 10, 210, in particular the planetary transmission 16, 216, has an output shaft 52 that can be rotated in relation to the housing 12 around the main rotational axis 38, via which output shaft the planetary transmission 16, 216 can provide torsional moments in the form of output torsional moments, in particular for driving the wheels. The respective output torsional moment here emerges from the respective torsional moment provided by the electric motor 40. The respective torsional moment can be derived from the planetary transmission 16, 216 via the output shaft 52.

The electric drive device 10, 210 moreover comprises a differential transmission 54, also referred to simply as differential. The differential transmission 54 is allocated to the axle and is thus also simply referred to as axle gear. For example, the wheels of the axle can be driven by the electric motor 40 via the differential transmission 54. Thus, the differential transmission 54 has the function, in particular, of distributing the respective torsional moment provided by the electric motor 40 to the wheels. The differential transmission 54 is also given the function of allowing a rotational speed compensation between the wheels or different rotational speeds of the wheels, for example in the event of the motor vehicle driving round a curve. Here, the differential transmission 54 can be driven by the output shaft 52 or via the output shaft 52 by the planetary transmission 16, 216, as is explained in more detail below.

The drive device 10, 210 has a first switching element 56, by means of which the first gear ring 26 can be non-rotationally connected to the housing 12. Moreover, the drive device 10, 210 has a second switching element 58, 258 by means of which, in the first embodiment, the second gear ring 34 can be non-rotationally connected to the first planetary support 24. Here, the planetary gearsets 18 and 20 are arranged coaxially in relation to the differential transmission 54. In order to now be able to implement a particularly compact construction and a particularly efficient operation of the electric drive device 10, 210, the differential transmission 54 has a ball differential, also referred to as a bevel gear differential and/or formed as a bevel gear differential, with a compensation housing 62 also referred to as a differential cage. In the first embodiment, the output shaft 52 is permanently non-rotationally connected to the compensation housing 62.

The respective output torsional moment provided by the output shaft 52 can be transferred to the compensation housing 62, whereby the compensation housing 62 can be driven or is driven. By driving the compensation housing 12, this is rotated around the main rotational axis 68, in particular in relation to the housing 12.

It can be seen from FIG. 3 and FIG. 4 that the bevel differential 60 is characterized in that the compensation housing 62 delimits a receiving chamber 64, also referred to as a receiving region. The bevel differential 60 is formed as a bevel gear differential, which has two compensation gears 66 and 68 mounted rotatably on the compensation housing 62 and two output gears 70 and 72 that can be rotated, in particular, in relation to the compensation housing 62. The output gears 70 and 72 simultaneously mesh with the compensation gears 66 and 68. The compensation gears 66 and 68 and the output gears 70 and 72 are gear wheels, which are formed as bevel gears. The gear wheels are arranged at least partially, in particular at least extensively or completely, in the receiving chamber 64.

The output gears 70 and 72 are connected, in particular permanently, non-rotationally to respective lateral shafts 74 and 76. Here, the wheels of the motor vehicle mentioned above can be driven via the lateral shafts 74 and 76, such that the wheels can be driven via the lateral shafts 74 and 76 by the output gears 70 and 72 and thus by the differential transmission 54.

In FIGS. 3 and 4, respective arrows 78 and 80 illustrate a respective drive torsional moment resulting from the respective output torsional moment, by means of which drive torsional moment the respective gear or the respective lateral shaft 74 or 76 can be driven or is driven. If the compensation housing 62 is rotated around the main rotational axis 38, in particular in relation to the housing 12, then the compensation gears 66 and 68 are rotated around the main rotational axis 38, in particular in relation to the housing 12. For example, the output gears 70 and 72 and, via these, the lateral shafts 74 and 76 and thus the wheels are then driven by the compensation gears 66 and 68, whereby the motor vehicle overall can be driven.

The compensation housing 62 is here permanently non-rotationally connected to the first planetary support 24. Furthermore, the first sun gear 22 is arranged axially next to the compensation housing 62, wherein the largest outer diameter of the compensation housing 62 is greater than an outer diameter, in particular the largest outer diameter, of the first sun gear 22. This means, for example, that the compensation housing 62 protrudes outwardly beyond the first sun gear 22 in the radial direction running perpendicularly to the axial direction of the respective planetary gearset 18 or 20.

The second sun gear 30 is arranged axially at the height of the compensation housing 62, such that at least one part of the compensation housing 62 is surrounded outwardly by the second sun gear 30 in the radial direction of the respective planetary gearset 18 or 20 and thus in the radial direction of the drive device 10.

Here, an inner diameter of the second sun gear 30 is greater than the largest outer diameter of the compensation housing 62. In particular, it is conceivable that at least one part of the compensation housing 62, in particular the largest outer diameter of the compensation housing 62, is arranged radially inside the sun gear. Thus, the sun gear 30 is formed in the manner of a hollow shaft, which is penetrated by the compensation housing 62. When seen in the direction of the main rotational axis 38, i.e., in the axial direction, the compensation housing 62 completely overlaps with the second sun gear 30.

A first force transmission region of the first switching element 56 formed as a lamellae packet is arranged to radial surround and axial overlap with the first planetary gearset 18.

In the first embodiment shown in FIGS. 1, 3, and 4, the second switching element 58, 258 is arranged axially on a side of the second planetary gearset 20 facing away from the first planetary gearset 18.

In the first embodiment, the electric drive device 10, 210 comprises a first axial bearing 82, via which the first planetary support 24 can be supported in the axial direction in relation to the second sun gear 30 or is supported and thus mounted. Here, the first axial bearing 82 is arranged in the axial direction between the first planetary gearset 18 and the second planetary gearset 20.

In the first variant shown in FIG. 3 of the first embodiment, the electric drive device 10 moreover comprises a second axial bearing 84, by means of which the second sun gear 30 can be supported or is supported and thus mounted in the axial direction on the second planetary support 32, wherein the second axial bearing 84 is arranged axially on the output side of the second planetary support 32 of the second planetary gearset 20. Furthermore, in this first variant, a third axial bearing 86 is provided by means of which the second planetary support 32 is supported and thus mounted in the axial direction on the second gear ring 34 or a second gear ring shaft 34a non-rotationally connected to the second gear ring 34. Here, the third axial bearing 86 is arranged axially on a side of the second axial bearing 84 facing away from the second planetary gearset 20.

By means of a fourth axial bearing 87, the second gear ring 34 is axially supported in opposition to a parking locking wheel 98 or in opposition to a hub 99 of the parking locking wheel 98 or in opposition to the compensation housing 62.

By means of a fifth axial bearing 90, the compensation housing 62 and, with this, the parking locking wheel 98 in relation to the housing is supported axially in opposition to the housing 12.

In the particularly advantageous second variant of the first embodiment shown in FIG. 4, the third axial bearing 86 is omitted. By means of the second axial bearing 284, the second sun gear 30 is here directly supported in relation to the second gear ring shaft 234a. The second gear ring shaft 234a is non-rotationally connected to the second gear ring 34.

The electric drive device 10, 210, in particular the planetary transmission 16, 216, moreover has a first radial bearing 88, by means of which the first planetary support 24 is supported in the radial direction against the first sun gear 22. Here, the first radial bearing 88 is advantageously arranged on the input side, i.e., axially on a side of the first planetary gearset 18 facing away from the second planetary gearset.

A second radial bearing 89 of the electric drive device 10, 210 is provided to support the second gear ring 34 radially in relation to the compensation housing 62. The second radial bearing 89 is advantageously arranged on a side of the second planetary gearset 20 facing away from the first planetary gearset 18 when seen in the axial direction.

Particularly advantageously, exactly two radial bearings are provided inside the planetary transmission 16, 216, namely the first radial bearing 88 and the second radial bearing 89.

Moreover, the drive device 10, 210 comprises a fifth axial bearing 90, via which the second gear ring 34 is supported and thus mounted on the housing 12 in the axial direction. The fifth axial bearing 90 is here advantageously arranged axially on the output side of the second planetary gearset 20 and radially inside the greatest outer diameter of the compensation housing 62, such that the compensation housing 62, for example, protrudes outwardly beyond the fifth axial bearing 90 in the radial direction.

In the first embodiment shown in FIGS. 1, 3, and 4 of the electric drive device 10, 210 and also in the second embodiment shown in FIG. 2 of the electric drive device 110, the first switching element 65 is formed as a brake, in particular as a friction brake, and here is formed as a lamellae switching element, i.e., as a lamellae brake. Thus, for example in the first embodiment, the gear ring 26 is non-rotationally fixed on the housing 12 by means of the switching element 56, in particular solely, in a frictionally locking or force locking manner.

In contrast to this, the second switching element 58, 158, 258 has, in both embodiments, at least one form fit element, such that, in the first embodiment, the second gear ring 34 can be non-rotationally connected to the first planetary gearset 24 by means of the second switching element 58, 258 and, in the second embodiment, the first gear ring 26 can be connected to the second sun gear 30 by means of the second switching element 158.

In both embodiments, the second planetary support 32 is permanently non-rotationally connected to the housing 12. Particularly advantageously, an oiling of the second planetary gearset 36 can be carried out starting from an oil channel arranged in the housing 12 and a further oil channel arranged in or on the second planetary support 32.

Since the first switching element 56 is formed as the lamellae switching element, the first switching element 56 has an inner lamellae support 92 and inner lamellae. The inner lamellae are supported or can be supported on the inner lamellae support 92 in the peripheral direction running around the main rotational axis 38, such that torsional moments running around the main rotational axis 38 can be transferred between the inner lamellae and the inner lamellae support 92. The inner lamellae support 92 is formed, particularly advantageously, integrally with the first gear ring 26. Here, a connecting element 94 is advantageously provided, which is non-rotationally connected to the second sun gear 30, in particular via a plugging or welding connection. Thus, the sun gear 30 and the connecting element 94, for example, are parts formed separately from each other and connected non-rotationally to each other, which are non-rotationally connected to each other via a plugging or welding connection. Here, the connecting element 94 is connected non-rotationally to the gear ring 26 and thus non-rotationally to the inner lamellae support 92, in particular via a plugging or welding connection. Thus, the gear ring 26 and the connecting element 94 are parts formed separately from each other which are non-rotationally connected to each other, in particular via a plugging or welding connection.

The electric drive device 10, 210 moreover has a parking lock 96, via which the outlet shaft 52 and thus the compensation housing 62 is non-rotationally connected to the housing 12 and can thus be secured against relative rotations taking place around the main rotational axis 38 and in relation to the housing 12. Thus, the wheels of the motor vehicle can also be secured against unwanted rotations, such that an unwanted rolling away of the motor vehicle can be prevented, for example by means of the parking lock 96, in particular when the motor vehicle is parked on a slope.

As a result of the arrangement of the axial bearings 82, 84, 86, 87, and 90, all axial forces can be very well diverted out of the planetary transmission 16, 216 into the housing 12 in the two directions coinciding with the axial direction. The possibility of respectively arranging the axial bearings 82, 84, and 86 on the same or similar diameter, such that an at least substantially rectilinear flux of force can be ensured, is particularly advantageous.

In the first embodiment illustrated in FIGS. 3 and 4, the electric motor 40 formed as an inner runner, such that at least one longitudinal region of the rotor 44 is arranged inside the stator 42 or is covered outwardly in the radial direction by the stator 42. Of course, it is alternatively conceivable that the electric motor 40 is designed as an outer runner.

The electric drive device 210 shown in FIG. 4 in its second variant of the first embodiment differs from the electric drive device 10 in the first variant of the first embodiment in that, as described above, the third axial bearing 86 is omitted.

Moreover, in the second variant depicted in FIG. 4, the second switching element 258 is designed somewhat differently in terms of the details to the first variant depicted in FIG. 3.

In the first particularly advantageous variant shown in FIG. 3, a first coupling element 58a of the second switching element 58 is arranged non-rotationally and axially shiftably in relation to the parking blocking wheel 98. A sliding sleeve 58c is here connected non-rotationally and axially fixedly to the first coupling element 58a. A second coupling element 58b of the second switching element 58 is here connected non-rotationally and axially fixedly to the second gear ring 34. The sliding sleeve 58*c* is here advantageously arranged axially on a side of the parking locking wheel 98 facing away from the second planetary gearset.

In the second particularly advantageous variant, a first coupling element 258*a* of an alternative second switching element 258 is connected non-rotationally and axially fixedly to a parking locking wheel 298, wherein a second coupling element 258*b* is connected non-rotationally and axially fixedly to the second gear ring 34. An alternative sliding sleeve 258*c* is here arranged non-rotationally and axially shiftably in relation to the first coupling element 258*a*.

The second embodiment, shown in FIG. 2, of an electric drive device 110 differs from the first embodiment above all in that a corresponding planetary transmission 116 has a second switching element 158, which is provided to connect the first gear ring 18 non-rotationally to the second sun gear 30. The bearing concepts shown in FIGS. 3 and 4 can be readily used for the second embodiment.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

10; 110; 210 Drive device
12 Housing
16, 216 Planetary transmission
18 first planetary gearset
20 second planetary gearset
22 first sun gear
24 first planetary support
26 first gear ring
28 first planetary gear
30 second sun gear
32 second planetary support
34 second gear ring
34*a*, 234*a* second gear ring shaft
36 second planetary gearset
38 main axis of rotation
40 Electric motor
42 Stator
44 Rotor
46 Motor axis of rotation
48 Arrow
50 Input shaft
52 Output shaft
54 Differential transmission
56 first switching element
58, 258 second switching element
58*a*, 258*a* First coupling element
58*b*, 258*b* Second coupling element
58*c*, 258*c* Sliding sleeve
60 Ball differential
62 Compensation housing
64 Receiving chamber
66 Compensation gear
68 Compensation gear
70 Output gear
72 Output gear
74 Lateral shaft
76 Lateral shaft
78 Arrow
80 Arrow
82 First axial bearing
84, 284 Second axial bearing
86 Third axial bearing
87 Fourth axial bearing
88 First radial bearing
89 Second radial bearing
90 Axial bearing
92 Inner lamella support
94 Connecting element
96 Parking lock
98, 298 Parking lock gear
99 Hub The invetion claimed is:

1. An electric drive device for a motor vehicle, the electric drive device comprising:
    a housing;
    a first planetary gearset arranged in the housing, wherein the first planetary gearset has a first sun gear as first elements, a first planetary support, and a first gear ring;
    a second planetary gearset arranged in the housing, wherein the second planetary gearset has a second sun gear that is coupled or is couplable non-rotationally to the first gear ring as second elements, a second planetary support, and a second gear ring;
    an electric motor having a stator and a rotor;
    an input shaft drivable by the rotor and is permanently non-rotationally connected to the first sun gear;
    an output shaft;
    a differential transmission;
    a lateral shaft; and
    a first switching element configured to connect the first sun gear non-rotationally to the housing,
    wherein the rotor, the first planetary gearset, the second planetary gearset, and the differential transmission are arranged coaxially to one another,
    wherein the lateral shaft is arranged between the differential transmission and a wheel of the motor vehicle and penetrates the rotor,
    wherein the second planetary support is permanently non-rotationally connected to the housing,
    wherein a second switching element is provided by means of which the second gear ring can be non-rotationally connected to the first planetary support,
    wherein the first gear ring is permanently non-rotationally connected to the second sun gear,
    wherein the second switching element is arranged axially on a side of the second planetary gearset facing away from the first planetary gearset,
    wherein the differential transmission has a bevel differential having a compensation housing, which is permanently non-rotationally connected to the first planetary support, wherein the first sun gear is arranged axially close to the compensation housing,
wherein a largest outer diameter of the compensation housing is greater than an outer diameter of the first sun gear,
wherein the second sun gear is arranged axially overlapping with the compensation housing,
wherein an inner diameter of the second sun gear is larger than the largest outer diameter of the compensation housing,
wherein at least one part of the first switching element is arranged to radially surround and axially overlap with the first planetary gearset,
wherein the electric drive device comprises exactly two radial bearings, the exactly two radial bearings includes a first radial bearing and a second radial bearing,
wherein the first radial bearing is arranged to radially support the first planetary support against the first sun gear, wherein the first radial bearing is arranged axially on a side of the first planetary gearset facing away from the second planetary gearset, and
wherein the second radial bearing is arranged to support the second sun gear against the compensation housing.

2. The electric drive device of claim 1, further comprising:
a first axial bearing arranged to axially support the first planetary support against the second sun gear, wherein the first axial bearing is arranged axially between the first planetary gearset and the second planetary gearset.

3. The electric drive device of claim 2, further comprising:
a second axial bearing, which is arranged axially between the second sun gear and a second gear ring shaft of the second gear ring, wherein the second axial bearing is arranged axially on a side of the second planetary gearset facing away from the first planetary gearset.

4. The electric drive device of claim 3, further comprising:
a fourth axial bearing, by means of which the second sun gear is supported axially against a parking locking gear.

5. The electric drive device of claim 4, further comprising:
a fifth axial bearing arranged to support the compensation housing against the housing, wherein the fifth axial bearing is arranged axially on an output side of the second planetary gearset and radially within the largest outer diameter of the compensation housing.

6. The electric drive device of claim 1, further comprising:
a connection element formed integrally with an inner lamellae carrier of the first switching element, wherein the connection element is non-rotationally connected to the first gear ring on a first side by a first plugging or welding connection or non-rotationally to the second sun gear on a second side by a second plugging or welding connection.

7. The electric drive device of claim 1, further comprising:
an oil channel arranged on the second planetary carrier, wherein the oil channel is configured to allow oiling a bearing point of the second planetary gear can be oiled starting from the housing.

* * * * *